United States Patent [19]

Bratzler et al.

[11] 3,896,215

[45] July 22, 1975

[54] PROCESS FOR THE REMOVAL OF HYDROGEN SULFIDE FROM A GAS STREAM

[75] Inventors: Karl Bratzler, Bad Homburg; Alexander Doerges; Johann Schlauer, both of Frankfurt am Main-Goldstein, all of Germany

[73] Assignee: Metallgesellschaft Aktiengesellschaft, Frankfurt am Main, Germany

[22] Filed: Oct. 19, 1973

[21] Appl. No.: 407,997

[30] Foreign Application Priority Data
Nov. 3, 1972 Germany............................ 2253806

[52] U.S. Cl. .................. 423/573; 423/574; 423/542
[51] Int. Cl............................................... C01b 17/04
[58] Field of Search ........... 423/224, 539, 542, 573, 423/574

[56] References Cited
UNITED STATES PATENTS

| | | | |
|---|---|---|---|
| 2,087,889 | 7/1937 | Bacon et al. | 423/569 |
| 2,142,987 | 1/1939 | Bacon et al. | 423/539 |
| 2,992,065 | 7/1961 | Feustel et al. | 423/244 |

FOREIGN PATENTS OR APPLICATIONS

| | | |
|---|---|---|
| 1,151,398 | 5/1969 | United Kingdom |
| 1,809,329 | 9/1970 | Germany |

OTHER PUBLICATIONS

Chemical Abstracts; vol. 70; 1969, page 278, para. 23259a.

*Primary Examiner*—G. O. Peters
*Attorney, Agent, or Firm*—Karl F. Ross; Herbert Dubno

[57] ABSTRACT

A process for the removal of hydrogen sulfide from a gas stream or for the conversion of hydrogen sulfide to elemental sulfur according to the CLAUS process comprises passing the gas stream through a CLAUS-process reactor having at least one contact stage thereby transforming much of the hydrogen sulfide into elemental sulfur. The effluent gas, containing residual sulfur and hydrogen sulfide is afterburned in the presence of a coke layer with a quantity of oxygen sufficient to react stoichiometrically with the sulfur and hydrogen sulfide and the resulting sulfur dioxide is scrubbed from the gas by an absorber. The sulfur dioxide is desorbed with steam and is recycled to the first contact stage of the CLAUS process.

11 Claims, 1 Drawing Figure

PATENTED JUL 22 1975 3,896,215
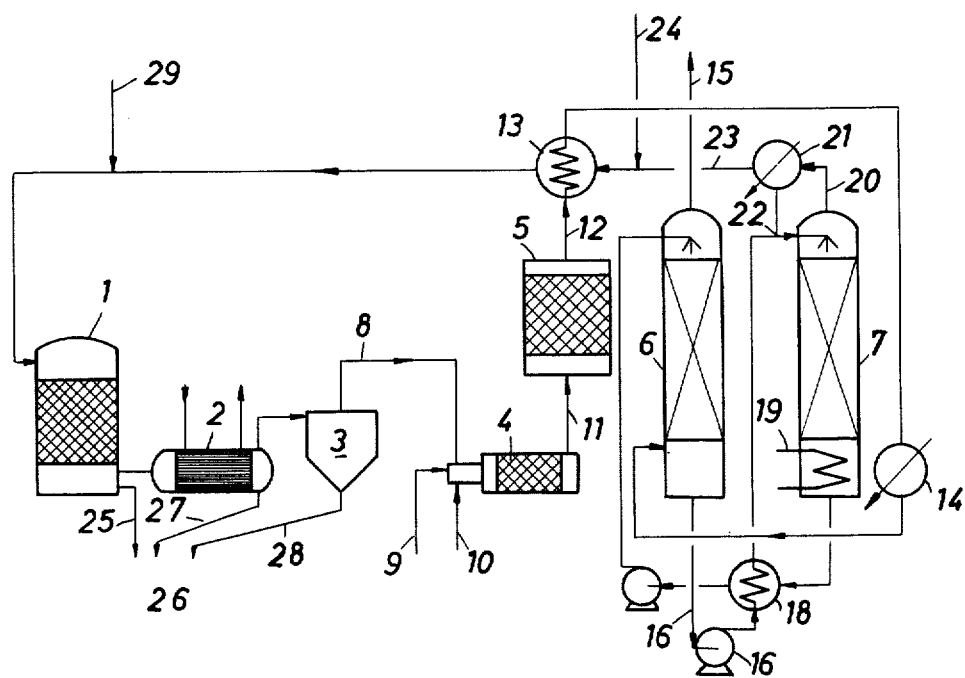

PROCESS FOR THE REMOVAL OF HYDROGEN SULFIDE FROM A GAS STREAM

FIELD OF THE INVENTION

The present invention relates to a process or method of removing hydrogen sulfide from a gas stream or for the transformation of hydrogen sulfide to elemental sulfur using the CLAUS process.

BACKGROUND OF THE INVENTION

Manufactured synthesis gases and fuel gases must be desulfurized as a rule before they are used. This is required to prevent a poisoning of catalysts, which in most cases are susceptible to sulfur, and to minimize the sulfur dioxide content of the flue gases of combustion.

Such gases are preferably desulfurized by being scrubbed with liquid absorbents. In many cases, carbon dioxide is scrubbed from the gas together with the sulfur compounds.

Suitable absorbent solutions are aqueous solutions of alkali salts of weak inorganic or organic acids or of strong organic bases, which owing to their alkalinity absorb and reversibly chemically combine with acid gas components, particularly $H_2S$ and $CO_2$, or chemically neutral organic solvents, which physically dissolve the contaminating gas components in dependence on the absorption coefficient of the solvent and on the partial pressure.

The chemically acting solvents and the physically acting solvents are regenerated by being heated, stripped, and, if desired, flashed so that they possess their entire capacity when they are recycled to the gas-cleaning process. The regeneration results in the formation of a gaseous mixture of the absorbed gas components. The sulfur compounds must be isolated from this mixture in that they are transformed into nonvolatile sulfur compounds or preferably into elemental sulfur.

The exhaust gases from the reaction are generally processed by the CLAUS process, in which all hydrogen sulfide contained in the exhaust gas is reacted in the CLAUS process vessel with a stoichiometric amount of atmospheric oxygen. In this way, 70 percent of the hydrogen sulfide is converted into elemental sulfur. In the succeeding CLAUS catalyst stage, the residual $H_2S$ and $SO_2$ are reacted at temperatures between 200° and 300°C according to the equation $$2 H_2S + SO_2 = H_2O + 45$$

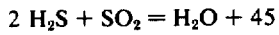

to form elemental sulfur and water.

Because the reaction tends to establish an equilibrium, that part of the process which involves the catalytic reaction of $H_2S$ and $SO_2$ is generally carried out in a plurality of stages. Between the stages, the reaction mixture is cooled to condense the sulfur. Because the exhaust gas from the last stage still contains water vapor and sulfur vapor, a yield of more than 99 percent sulfur based on the sulfur content of the reacted gas can be reached or even exceeded only with very expensive equipment.

If, e.g., a feed gas which contains 50 percent hydrogen sulfide by volume is reacted in a CLAUS process plant which comprises two catalytic stages and in which the temperature at the second stage is about 225°C, the theoretical conversion of 99.6 percent is not entirely reached. In such a case, the exhaust gas still contains 0.2–0.3 percent by volume $H_2S$ and 0.1–0.15 percent by volume $SO_2$. Still poorer conversions can be attained in practice if the gas to be processed contains less hydrogen sulfide, e.g., only 25–40 percent by volume. It must be expected that still larger quantities of gas having even lower $H_2S$ contents of about 5–20 percent by volume will have to be processed in the future and it can be predicted that the $H_2S$ and $SO_2$ contents in the exhaust gas will not lie below the permissible emission limit with the previous mode of operation of CLAUS process plants.

OBJECTS OF THE INVENTION

It is the principal object of the present invention to provide an improved method of removing hydrogen sulfide from a gas stream with greater efficiency and decreased operating and equipment costs and to a greater extent than has been possible heretofore.

It is another object of the invention to improve upon the efficiency of a CLAUS-type process for converting hydrogen sulfide to elemental sulfur and thereby free a gas-containing hydrogen sulfide from sulfur compounds to a greater extent than has been possible heretofore.

SUMMARY OF THE INVENTION

These objects and others which will become apparent hereinafter are attained, in accordance with the present invention, with a process in which a gas stream containing hydrogen sulfide is introduced into at least one contact stage of a CLAUS process reactor or system in which the hydrogen sulfide is converted predominantly to elemental sulfur as described previously. The effluent gas stream, containing residual hydrogen sulfide and entrained elemental sulfur is subjected to an after-burning in the presence of oxygen to form sulfur dioxide and the latter is scrubbed from the gas stream by an absorbent capable of the selective but reversible binding of sulfur dioxide. The sulfur dioxide is desorbed from the absorbent by subjecting the same to heat, preferably by stripping with steam, and the absorbed or pure sulfur dioxide is recycled to the gas stream admitted to the first stage of the CLAUS process.

It has been found that independently of the $H_2S$ content of the gas to be processed and without the need for a maximum conversion in the last catalytic stage of the CLAUS process, an effluent gas which is virtually free of sulfur can be produced and the reacted hydrogen sulfide can be completely converted into elementary sulfur if the free or combined sulfur contained in the effluent gas from the CLAUS process is completely converted into $SO_2$ by a combustion in the presence of a surplus of air and, this $SO_2$ is removed from the exhaust gas and recycled to the CLAUS process.

It is known to afterburn the exhaust gas from the CLAUS process in order to convert the residual elemental sulfur and hydrogen sulfide contained therein into sulfur dioxide.

It is also known to scrub the exhaust gases from the afterburning of the CLAUS process or from the catalytic production of sulfuric acid with water so as to remove sulfur dioxide and to strip the water with air so as to expel the absorbed $SO_2$. The resulting mixture of sulfur dioxide and air is recycled to the process by which sulfur dioxide is produced, e.g., in a process of roasting sulfide ores, a sulfur-burning process or the like. The contact of sulfur dioxide with oxygen or air always results in the formation of small quantities of $SO_3$, which are thus enriched in the scrubbing water so as to form sulfuric acid. This sulfuric acid is an undesired by-product in the CLAUS process of recovering elemental sulfur.

Owing to the sulfur trioxide content of such exhaust gases, even alkaline absorbent solutions which are quite suitable to remove sulfur dioxide are quickly rendered ineffective by formation of sulfates. The sulfate-containing absorbent solution can be regenerated only with an unreasonably high expenses.

It is known from the British Pat. No. 744,908 that $SO_2$ can be scrubbed from gases to residual BACKGROUND concentrations below 0.05 percent by volume by means of organic bases. The loaded absorbent is preferably regenerated by being heated and stripped with water vapor. In this case no $SO_3$ is formed whereas is would be formed if the laden absorbent solution were stripped with air.

It has now been found that the formation of $SO_3$ begins already during the afterburning of the exhaust gas from the CLAUS process because this afterburning requires a surplus of air and that for protecting the alkaline solution used for the absorption of $SO_2$ and $SO_3$ the surplus oxygen must be removed from the afterburned exhaust gas.

According to the invention, the afterburned exhaust gas is passed at a temperature of 200°–500°C., preferably of 280°–400°C., through a layer of granular coke. At these temperatures, $SO_3$ is reduced to $SO_2$ by the granular coke and the latter oxidized to $CO_2$. When the gas thus being treated is cooled to a temperature below 100°C., preferably approximately to at ambient temperature, the treated gas can be scrubbed with alkaline, preferably aqueous absorbent solutions to remove the sulfur dioxide and to form alkali sulfite ($MeSO_3$) without formation of any alkali sulfate ($MeSO_4$).

It has also been found that the exhaust gas from the CLAUS process can be afterburned in the same coke chamber in which the gas is passed through the coke layer to reduce the sulfur trioxide to sulfur dioxide and to reduce the oxygen to carbon dioxide. For this purpose, atmospheric oxygen approximately in a stoichiometric amount and possible slightly in excess of the quantity required for the oxidation of the residual hydrogen sulfide and of the sulfur vapor to sulfur dioxide is added to the gas immediately before it enters the coke chamber. This procedure according to the invention eliminates the need for a separate afterburning furnace before the coke chamber.

The chambers may be intermittently or continuously charged with granular coke.

Suitable scrubbing solutions are the aqueous solutions of alkali salts of weak inorganic or organic acids, provided that these acids are weaker acids than sulfurous acid as determined from their electrolytic dissociation constant.

Alkali salts which may be used include alkali sulfite, alkali borate, alkali arsenite, alkali vanadate, alkali phosphate, alkali phenolate, and the alkali salts of the simple amino acids or of aromatic carboxylic acids. Organic bases, such as aniline, toluidine, xylidine, quinoline and their derivates may be used with a certain water content. The alkali metals of the salts can be sodium and potassium.

Cokes which are suitable for the aftertreatment to which the afterburned exhaust from the CLAUS process is subjected according to the invention include reactive cokes produced from brown coal or true coal or petroleum cokes, which have been made by a carbonization at moderate temperatures, preferably below 700°C.

Because by this treatment of the afterburned exhaust gas in accordance with the invention all elementary and fixed sulfur contained in the residual gas from the CLAUS process is transformed into sulfur dioxide, it is no longer necessary to operate the actual CLAUS reaction in a multi-stage catalytic plant until hydrogen sulfide and $SO_2$ have been reacted as completely as possible and to aim at separating the elementary sulfur from the product gas as completely as possible.

In the process according to the invention, the concentrated sulfur dioxide recovered from the afterburned exhaust gas may be recycled to the first catalytic stage of the CLAUS process to establish a surplus of $SO_2$ whereby the equilibrium is shifted in favor of the elementary sulfur so that the conversion is improved. For this reason the number of catalytic stages may be reduced to two stages and in favorable cases even to a single stage.

This $SO_2$ is recirculated through the catalytic stages, the afterburner, the hot coke bed and the $SO_2$ absorber relieves also the combustion furnace which is included in the usual CLAUS process plants for processing hydrogen sulfide-containing exhaust gases and in which part of the hydrogen sulfide is burned to form $SO_2$ and may entirely eliminate the need for such furnace where gases are processed having only a small hydrogen sulfide content.

This results in a modified CLAUS process, in which the $H_2S$-containing gas is introduced before the first catalytic stage into the path in which the sulfur dioxide is recirculated through the above-mentioned process stages. The sulfur dioxide required for the CLAUS reaction is recovered in the absorber in an oxygen-free state from the residual gas when the latter has been burned and aftertreated in contact with hot coke in accordance with the invention.

DESCRIPTION OF THE DRAWING

The above and other objects, features and advantages of the present invention will become more readily apparent from the following description, reference being made to the drawing in which the sole FIGURE is a diagram of a plant embodying the invention.

SPECIFIC DESCRIPTION

The plant consists essentially of a CLAUS reactor 1, a sulfur condenser 2, a sulfur separator 3, an afterburning chamber 4, a coke filter 5, an absorption tower 6 and a regenerator 7.

From the sulfur separator 3, the residual gas from the CLAUS process is passed in conduit 8 to the afterburning chamber 4 and is burned in said chamber, which is fed through conduit 9 with a preferably gaseous fuel and through conduit 10 with a surplus of air. By this combustion, non-condensed sulfur vapor and non-reacted hydrogen sulfide are converted into sulfur dioxide and small quantities of $SO_3$ are formed. The afterburned exhaust gas is passed through conduit 11 into the coke filter 3 after being subjected to interstage cooling. The coke filter 5 is operated at temperatures of 200°–500°C. to reduce the $SO_3$ to $SO_2$ and to consume the surplus oxygen by reaction with coke to $CO_2$.

At the outlet of the coke filter the gas is at a higher temperature than at the inlet thereof and now contains neither $SO_3$ nor free oxygen. Via a conduit 12, the gas is passed through a heat exchanger 13 and a cooler 14 and approximately at the ambient temperature is supplied into the absorption tower 6 above the sump thereof. In the tower 6, the gas is scrubbed with regenerated absorbent solution. An exhaust gas which contains less than 200 ppm sulfur dioxide leaves the absorption tower 6 at the top thereof and may be discharged into the atmosphere through the chimney 15.

The absorption solution which is laden with $SO_2$ is withdrawn from the sump of the absorption tower and via a conduit 16 is fed by a pump 17 through a heat exchanger 18 to the top of the regeneration tower 7, in which the solution flows down over packing to the sump. In the latter, the solution is heated to the boil by a heater 19 so that the absorbed $SO_2$ is entirely expelled and by the rising steam is stripped from the solution which is trickling down. From the top of the regeneration tower 7, the exhaust gas consisting of sulfur dioxide and water vapor is conducted through a conduit 20 to a condenser 21, from which the collected condensate is recycled in conduit 22 to the top of the regeneration tower.

The residual concentrated sulfur dioxide is conducted in a conduit 23 through the heat exchanger 13 to the CLAUS process reactor 1. The hydrogen sulfide-containing gas to be processed is added through a conduit 24 to that $SO_2$ stream before it enters the heat exchanger 13.

The CLAUS process reactor 1 and the associated sulfur condenser 2 and sulfur separator 3 may consist of a plurality of stages in known manner.

In the CLAUS process reactor, $H_2S$ and $SO_2$ are reacted in known manner in contact with a granular catalyst which consists preferably of bauxite. The elementary sulfur formed by the reaction is drained in a liquid state from the reactor 1 and is conducted via a conduit 25 to the collecting container 26, which through conduits 27 and 28 receives also the liquid sulfur which is collected in the sulfur condenser 2 and the sulfr separator 3.

In the processing of hydrogen sulfide-containing gases having a moderate $H_2S$ content up to about 10 percent by volume, the $SO_2$ may be recirculated at the rate which is required for the reaction. A surplus of $SO_2$ is desirable because it increases the conversion to elementary sulfur.

In the processing of gases rich in $H_2S$ it may be desirable to burn part of the gases with air and to supply the combustion gas, e.g. through a conduit 29 into the conduit 23 before the CLAUS process reactor.

SPECIFIC EXAMPLE

A manufactured fuel gas is scrubbed to remove carbon dioxide and hydrogen sulfide. The stripped gas from the regeneration consists mainly of $CO_2$ and contains 2.58 percent $H_2S$ by volume.

This gas is supplied through the conduit 24 into the plant shown in the drawing and is mixed with pure $SO_2$ recovered from the afterburned exhaust gas. The rate at which the exhaust gas from the regeneration is admixed to the afterburned exhaust gas is selected to provide a ratio of $H_2S:SO_2 = 1.8:1$. At a temperature of 229° C. this mixture is supplied to the reactor 1. When the condensible sulfur has been removed, the residual gas contains 0.71 percent by volume $H_2S$ and 0.40 percent by volume $SO_2$. The conversion to elementary sulfur amounts to 72 percent.

The residual gas is afterburned in the combustion chamber 4, which is supplied with fuel gas and air and in which a flue gas is produced which contains 0.45 percent by volume $SO_2$ and 0.5 percent by volume residual oxygen as well as 280 ppm $SO_3$.

The flue gas is cooled to such an extent that it can be introduced at about 320° C. into the coke filter, in which the $SO_3$ and $O_2$ contents of the flue gas are reduced to a few ppm. The gas leaving the filter is at about 420° C. and after being cooled to the ambient temperature is scrubbed in the absorption tower 6 with a 2.5-molar aqueous solution of secondary sodium phosphate ($Na_2H\ PO_4$). The scrubbed gas contains 180 ppm residual $SO_2$.

The $SO_2$-laden solution drained from the absorption tower is preheated to about 70° C. in the heat exchanger, which receives the hot regenerated absorbent solution and is then supplied to the top of the regeneration tower. The solution is heated to the boiling point in the sump of that tower. When the water vapor has been condensed, the exhaust gas from the regeneration consists of almost pure $SO_2$.

We claim:

1. A method of removing hydrogen sulfide from a gas stream, comprising the steps of:
   a. passing said gas stream through a Claus-process reactor having at least one stage and reacting the hydrogen sulfide with oxygen therein to produce elementary sulfur and an effluent gas stream containing residual sulfur at least part of which is in the form of hydrogen sulfides;
   b. afterburning said effluent gas stream and contacting same at a temperature of 200° to 500°C with a layer of coke to form sulfur dioxide and minimize sulfur trioxide formation
   c. cooling the gas stream contacted with said layer to a temperature of at most 50°C;
   d. scrubbing the cold gas with an absorbent solution capable of reversibly binding sulfur dioxide from which in the afterburning of said effluent gas stream;
   e. desorbing sulfur dioxide from the absorbent solution by the application of heat thereto; and
   f. feeding the desorbed sulfur dioxide to step (a) for admixture with the gas stream fed through said Claus-process reactor to augment the sulfur dioxide concentration thereof.

2. The method defined in claim 1 wherein said gas stream having said desorbed sulfur dioxide admixed therewith is introduced into the first contact stage of the Claus-process.

3. The method defined in claim 1 wherein the afterburning in step (b) is carried out in a chamber containing coke after the addition of oxygen thereto in the amount stoichiometrically sufficient to react all of said hydrogen sulfide and sulfur contained therein.

4. The method defined in claim 3, further comprising the step of feeding coke to said chamber over a period of time.

5. The method defined in claim 4 wherein the coke is fed to said chamber at intervals.

6. The method defined in claim 4 wherein the coke is fed to said chamber continuously.

7. The method defined in claim 1 wherein said absorbent is an aqueous solution of at least one alkali-metal of a weak inorganic or organic acid.

8. The method defined in claim 7 wherein said absorbent is at least one alkali-metal salt of sulfuric acid, boric acid, arsenious acid, metavanadic acid or phosphoric acid.

9. The method defined in claim 7 wherein said absorbent is an aqueous solution of at least one alkali-metal salt of carbonic acid, an amino acid, a carboxyclic acid or a sulfuric acid.

10. The method defined in claim 1 wherein said sulfur dioxide is desorbed from said absorbent in step (e) by treating same with steam.

11. The method defined in claim 1 wherein said layer of coke is a carbonization of lignite, bituminous coal or petroleum-refining residue.

* * * * *